(12) United States Patent
Beyrich et al.

(10) Patent No.: US 7,305,877 B2
(45) Date of Patent: *Dec. 11, 2007

(54) DEVICE FOR DETERMINING AT LEAST ONE PARAMETER OF A MEDIUM FLOWING IN A LINE HAVING DIVERSION SURFACE

(75) Inventors: Hans Beyrich, Freiberg/N (DE); Uwe Konzelmann, Asperg (DE); Christoph Gmelin, Stuttgart (DE); Oliver Hennig, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

This patent is subject to a terminal disclaimer.

(21) Appl. No.: 10/562,784

(22) PCT Filed: Jul. 6, 2004

(86) PCT No.: PCT/DE2004/001443

§ 371 (c)(1),
(2), (4) Date: Dec. 28, 2005

(87) PCT Pub. No.: WO2005/008186

PCT Pub. Date: Jan. 27, 2005

(65) Prior Publication Data

US 2007/0062275 A1  Mar. 22, 2007

(30) Foreign Application Priority Data

Jul. 14, 2003  (DE) .................. 103 31 751
Oct. 17, 2003  (DE) .................. 103 48 400

(51) Int. Cl.
  *G01F 1/68*  (2006.01)
(52) U.S. Cl. .................. 73/202.5; 73/204.21
(58) Field of Classification Search .............. None
  See application file for complete search history.

(56) References Cited

U.S. PATENT DOCUMENTS

| 4,457,169 | A | | 7/1984 | Lauterbach et al. |
| 5,476,012 | A | * | 12/1995 | Takashima ............... 73/861.34 |
| 5,485,746 | A | | 1/1996 | Mori et al. |
| 5,866,824 | A | | 2/1999 | Schieber et al. |
| 6,401,531 | B1 | * | 6/2002 | Tank et al. ............... 73/204.21 |
| 6,619,114 | B1 | * | 9/2003 | Lenzing et al. ............ 73/202.5 |
| 6,871,533 | B2 | * | 3/2005 | Lenzing et al. ............ 73/202.5 |
| 7,162,920 | B2 | * | 1/2007 | Konzelmann et al. ..... 73/202.5 |

FOREIGN PATENT DOCUMENTS

| DE | 101 35 142 | 10/2002 |
| WO | WO 92/21940 | 12/1992 |
| WO | WO 01/18494 | 3/2001 |
| WO | WO 01/18498 | 3/2001 |
| WO | WO 01/18499 | 3/2001 |

* cited by examiner

*Primary Examiner*—Harshad Patel
(74) *Attorney, Agent, or Firm*—Kenyon & Kenyon LLP

(57) ABSTRACT

A device for determining at least one parameter of a medium flowing in a line, in particular for determining the air mass flow rate in the intake manifold of an internal combustion engine, which include a line component 3 and a sensor device 1 having a bypass part 6, are known. To prevent separation of the flow at the sidewalls of the bypass part, it is provided that a flow diversion element 2 be positioned in the line component 3 upstream from the bypass part 6 with respect to the main flow direction 18 and have at least one diversion surface 20 facing the main flow direction 18, which, starting from an apex line 25 located at a distance from the bypass part 6, curves evenly on both sides toward the two sidewalls 16, 17 so that the ends 38 of the diversion surface 20 facing away from the apex line are aligned with the sidewalls 16, 17.

18 Claims, 8 Drawing Sheets

DEVICE FOR DETERMINING AT LEAST ONE PARAMETER OF A MEDIUM FLOWING IN A LINE HAVING DIVERSION SURFACE

FIELD OF THE INVENTION

The present invention relates to a device for determining at least one parameter of a medium flowing in a line.

DESCRIPTION OF RELATED ART

A device of this kind is known for example from DE 101 35 142 A1 and is used for example in the air intake manifold of an internal combustion engine to determine the air mass flow rate through a line to the internal combustion engine. A section of a sensor device having a bypass part is inserted through an insertion opening into the line component. The bypass part has a channel structure having an inlet area, from which a measuring channel, in which the measuring element is provided, branches off. Furthermore, the intake area has a removal area having at least one removal opening, which opens into the line through-channel at least one sidewall of the bypass part. The purpose of the removal zone is to remove liquid and/or solid particles from the channel structure and thus keep them from penetrating the measuring channel having the measuring element and soiling the measuring element.

In the case of the known devices, the edges, which are formed by the front side facing the main flow direction and by the sidewalls of the bypass part that has been inserted into the line, form flow contact edges at which large areas of separated flow arise, thus causing large losses of pressure and unintended pulsing of the flow, and as a result pressure fluctuations are transferred, via the removal opening, onto the measuring channel that branches off from the inlet area. The pressure fluctuations in the measuring channel may cause significant errors in the measuring element's output signal.

SUMMARY OF THE INVENTION

It is an object of the invention to determine at least one parameter of a medium flowing in a line. It is a further object of the invention to largely prevent separation of the flow with large areas of separated flow at the sidewalls of the bypass part.

These and other objects of the invention are achieved via an aerodynamic flow diversion element situated in the line component upstream from the bypass part with respect to the main flow direction and having at least one diversion surface facing the main flow direction, which, starting from an apex line located at a distance from the bypass part, curves evenly on both sides toward the two sidewalls so that the ends of the diversion surface facing away from the apex line are aligned with the sidewalls. If the flow diversion element is used and flow speeds in the line component are high, the boundary layer of the flow becomes turbulent as far upstream as the diversion surface of the flow diversion element, which is advantageous because in the turbulent flow there is greater pulse exchange of the flowing particles in flow layers close to and at a distance from the walls. As a result, the turbulent boundary layer flows along the diversion surface of the flow diversion element and in particular along the sidewalls of the bypass part without separating from them.

However, if flow speeds in the line component are low, there is no transition from a laminar to a turbulent flow. Instead, initially the medium flows along the diversion surface of the flow diversion element and then, in the area where the diversion surface transitions into the sidewalls, undergoes separation due to the local change in curvature at the transition from the curved diversion surface to the planar sidewall. Therefore to avoid separation of the flow when flow speeds in the line component are low, in an especially advantageous exemplary embodiment of the present invention a turbulence-generating structure is provided on the diversion surface or at least in the immediate proximity thereof at least upstream from the sidewall having the removal opening with respect to the main flow direction, and in particular on both parallel sidewalls of the bypass part, and generates turbulence in the boundary layer of the flow. As a result, even at low flow speeds in the line component the boundary layer becomes turbulent as far upstream as the area near the diversion surface and thus no longer separates from the sidewalls of the bypass part.

In accordance with the invention, there is provided a device for determining at least one parameter of a medium flowing in a main flow direction (18) in a line, in particular for determining the air mass flow rate in the intake manifold of an internal combustion engine, including a line component (3) that forms a line through-channel, and a sensor device (1) having a bypass part (6), which is situated in the line component (3) so that a partial stream of the medium flowing in the line component enters an inlet area (27) of a channel structure formed in the bypass part, the inlet area (27) having a removal opening (33) which opens into the line through-channel at least one of two sidewalls (16, 17) of the bypass part (6) that extend parallel to the main flow direction (18), wherein a flow diversion element (2) is situated in the line component (3) upstream from the bypass part (6) with respect to the main flow direction (18) and has at least one diversion surface (20) facing the main flow direction (18), which, starting from an apex line (25) located at a distance from the bypass part (6), curves evenly on both sides toward the two sidewalls (16, 17) so that the ends (38) of the diversion surface (20) that face away from the apex line are aligned with the sidewalls (16, 17).

BRIEF DESCRIPTION OF THE DRAWINGS

The invention will be described in greater detail with reference to the following drawings wherein.

DETAILED DESCRIPTION OF THE INVENTION

Figure 1:
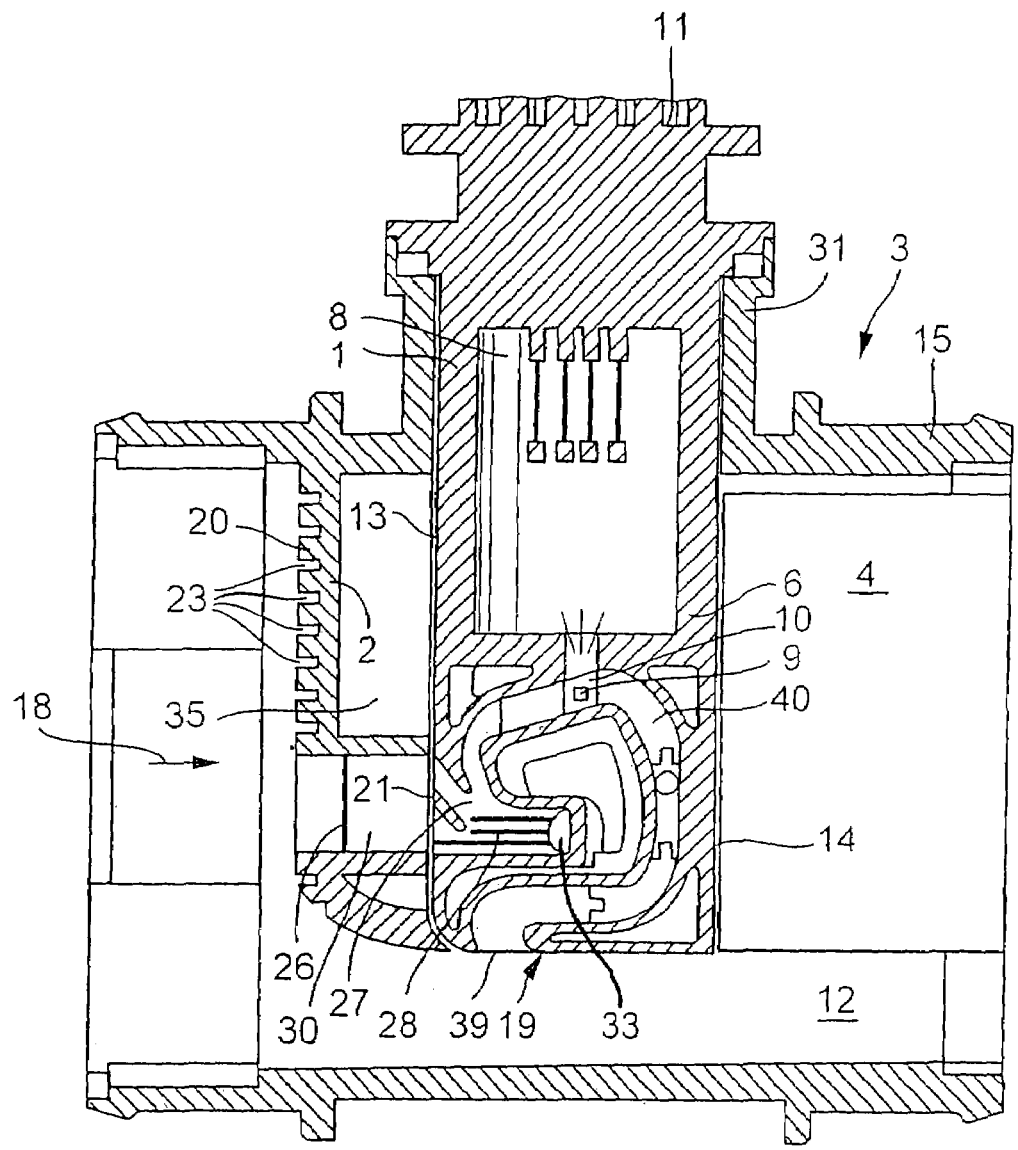
FIG. 1 shows a cross section through a first exemplary embodiment of the device according to the present invention.

In a particularly simple manner the flow diversion element may have an elliptically curved diversion surface. Herein, the small semi-axis of the elliptically curved diversion surface is equal to half the distance between the two sidewalls of the bypass part. The large semi-axis of the elliptically curved diversion surface is at least twice the length of the small semi-axis.

The turbulence-generating structure may be formed in a very simple manner via at least one wire applied to the diversion surface or situated in the immediate proximity thereof. The wire may, for example, have a plurality of alternating curves and a serrated shape having a large number of serrations.

An exemplary embodiment in which the turbulence-generating structure is formed via a plurality of slits created in the diversion surface, each of which is in a plane perpendicular to the sidewalls of the bypass part and parallel to the main flow direction, is particularly advantageous. The flow of medium that strikes the diversion surface in the main flow direction partially penetrates the slits and exits the slits again in the transition area between the flow diversion part and the bypass part. As a result, powerful longitudinal vortices arise in the flow upstream from the sidewalls of the bypass part, which result in a turbulent flow boundary layer and keep the boundary layer from separating from the sidewalls. Furthermore, water in the flow is captured by the slits and carried away in a lateral direction, without reaching the inlet area of the channel structure of the bypass part.

The slits may have a rectangular cross section having an inner surface between the diversion surface and the bypass part, which preferably is also, starting from a second apex line, elliptically curved toward the bypass part, and each of the ends of the inner surface facing away from the second apex line transitions into a surface extending diagonally relative to the sidewalls. This enhances the formation of longitudinal vortices when the flow exits the slits and thus enhances the generation of turbulence.

The flow diversion element has a through-opening, which is aligned with an opening of the inlet area of the channel structure, so that a partial stream of the medium flowing in the main flow direction in the line component is able to pass through the through-opening of the flow diversion element into the inlet area of the channel structure. The turbulence-generating structure may be positioned perpendicular to the main flow direction and parallel to the sidewalls above as well as below the through-opening and in particular additionally on the sidewalls that delimit the through-opening.

In order to allow existing sensor devices to continue to be used as insertable sensors inserted into the line component, it is feasible for the flow diversion element to be manufactured separately from the sensor device as a separate component. In particular the flow diversion element and the line component may also be designed as a single component. If the flow diversion element and the line component are for example injection-molded as a single component, this involves scarcely any additional production costs.

A further advantageous exemplary embodiment of the present invention combines the aerodynamic flow diversion element situated upstream from the bypass part with a rectifier element, in particular a lattice, situated level with the flow diversion element with respect to the main flow direction. The rectifier element evens out the flow not only downstream from but also in particular upstream from the rectifier element. It is true that it is known heretofore that rectifier elements may be used in a line component upstream or downstream from the measuring sensor to even out the flow; however, in conjunction with the flow diversion element there is the additional advantage that the rectifier element and the line component and the flow diversion element may be manufactured as a single component, for example via injection molding.

It is particularly advantageous to position the rectifier element downstream from the orifice of the through-opening of the flow diversion element with respect to the main flow direction, the through-opening being aligned with an opening of the inlet area of the channel structure. This has the advantage that the partial stream of the medium entering the through-opening of the flow diversion element and thus also entering the inlet area of the channel structure of the bypass part adjacent to the through-opening has not already passed through the rectifier. This ensures that the partial stream that enters is not influenced by slight local flow disruptions caused by the rectifier.

FIG. 1 shows a line component 3 having a wall 15, this being a roughly cylindrical casing surrounding a line through-channel 12, in which a medium flows in a main flow direction. In FIG. 1, the main flow direction is from left to right as indicated by an arrow 18. The main flow direction is defined as the direction in which the medium flows, starting from when it enters the line component until it exits it, flowing mainly through the line through-channel even if local vortices and areas of separation cause it to deviate from the main flow direction. Herein, the main flow direction is parallel to the central axis of wall 15 of line component 3 having the shape of a cylindrical casing. Line component 3 may for example be used in an intake manifold of an internal combustion engine. The medium is for example air flowing into the internal combustion engine.

A sensor device 1 is situated on line component 3 in such a way that a bypass part 6 of the sensor device having a channel structure extends into line through-channel 12 in the manner of a finger and is exposed there to the medium flowing in a predefined direction. When bypass part 6 is installed in line 3, it is positioned so that it meets predefined orientation requirements relative to the medium's main flow direction 18. Furthermore, sensor device 1 has an electrical connector 11 and a holder for a carrier component 8, which is connected to connector 11 and on which for example an analyzer unit is provided. Bypass part 6 of the sensor device may be introduced into line through-channel 12 via an insertion opening of wall 15 of line component 3, the insertion opening being surrounded by a flange 31. Carrier component 8 having the analyzer unit may be positioned inside and/or outside line through-channel 12.

Sensor device 1 has a measuring element 9 mounted on a measuring element carrier 10, the measurement data of which may be evaluated by the analyzer unit. Using measuring element 9, for example the volume flow or the mass flow of the flowing medium, in particular the air mass flow rate, may be determined. Further parameters which may be measured are for example pressure, temperature, concentration of a specific component in the medium, or flow speed, which may be determined using a suitable sensor element.

Bypass part 6 has a housing having a, for example, cuboid structure having a front wall 13 which, when installed, faces main flow direction 18 of the medium, and a rear wall 14 which faces away therefrom, a first sidewall 17 and a second sidewall 16 parallel thereto, and a third wall 19 on the end inserted into the line, which extends for example parallel to the main flow direction. Furthermore, part 6 has a channel structure situated in it, having an inlet area 27 and a measuring channel 40 which branches off from inlet area 27. A partial stream of the medium flowing in main flow direction 18 passes through an opening 21 on front side 13 of bypass part 6 into inlet area 27 of the channel structure. From inlet area 27, the medium partly passes into measuring channel 40 having measuring element 9, and partly flows on into a removal zone 28 which is situated behind the branching point for the measuring channel and which opens into through-channel 12 via at least one removal opening 33 situated in first sidewall 16 and/or second sidewall 17. In the case of the exemplary embodiment shown in FIG. 1, main flow direction 18 is in a plane in which removal opening 33 is also situated. A first partial stream of the medium that has entered inlet area 27 flows completely into measuring channel 40 and exits it via outlet 39 in wall 19, and a second partial stream flows completely through removal opening 33 back into line component 3. For example liquid and/or solid particles, e.g. oil or water particles, are present in the flowing medium which could soil or damage measuring element 9. Because of removal opening 33 and the geometric design of the channel structure in the inlet area, the liquid and solid particles do not pass into the measuring channel but rather flow back into line through-channel 12.

Figure 2:
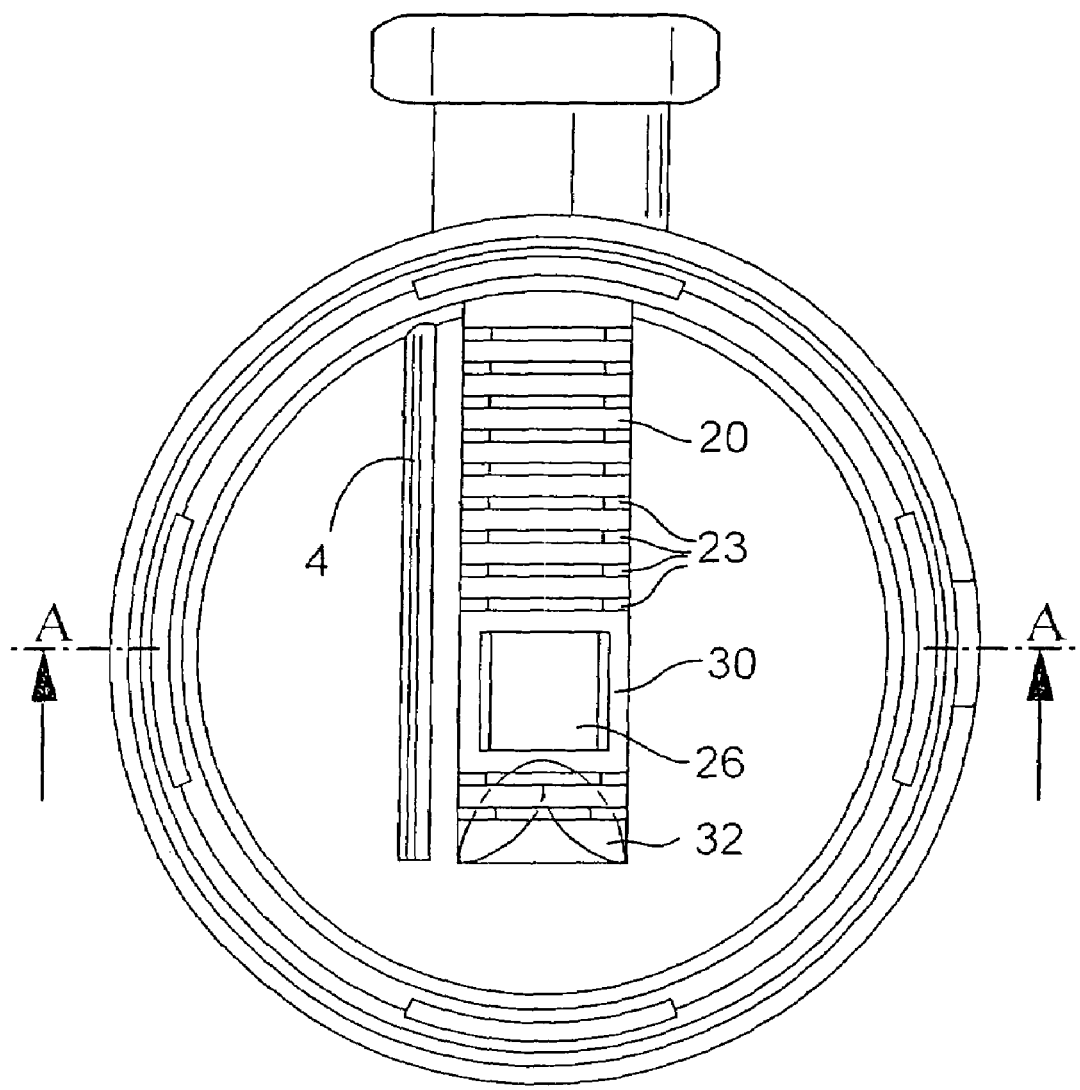
FIG. 2 shows a top view of the exemplary embodiment shown in FIG. 1.

Furthermore, as shown in FIG. 1, a flow diversion element 2 is situated in line component 3, and is situated directly upstream from bypass part 6 with respect to main flow direction 18. In this exemplary embodiment, flow diversion element 2 is manufactured separately from sensor device 1, as a separate component; however, it may also be connected to it as a single component. In FIG. 1, flow diversion element 2 and line component 3 are manufactured as a single component, as a plastic injection-molded component. The flow diversion element has a diversion surface 20 which faces main flow direction 18. As can be seen most clearly in FIG. 3, starting from an apex line 25, which is at a distance from bypass part 6 in the opposite direction to the main flow direction, diversion surface 20 curves evenly on both sides toward the two sidewalls 16, 17 50 that ends 38 of diversion surface 20 that face away from the apex line are aligned with sidewalls 16, 17 (ends 38 transition continuously into sidewalls 16 and 17 without forming an edge). This may be accomplished for example via a circular cylinder surface upstream from front surface 13. However, in the preferred exemplary embodiment shown here, diversion surface 20 is elliptically curved. As shown in FIG. 4, small semi-axis b of elliptically curved diversion surface 20 is equal to half the distance between the two sidewalls 16, 17 of the bypass part. Large semi-axis a of elliptically curved diversion surface 20 is at least twice as long as small semi-axis b. Furthermore, flow diversion element 2 has a through-opening 26, which is aligned with opening 21 of inlet area 27 of the channel structure, so that a partial stream of the medium in main flow direction 18 passes through through-opening 26 and opening 21 into inlet area 27. As shown in FIG. 2, the sides of through-opening 26 are delimited by walls 30, the outside of which form a part of curved diversion surface 20. In addition, on the side of bypass part 6 having removal opening 33, a guide wall 4 may be provided in line component 3 parallel to sidewall 16 and downstream from side 14 of bypass part 6 that faces away from front surface 13, and at least downstream from removal opening 33. Guide wall 4 is not aligned with the sidewall, but rather is situated opposite and offset relative to the sidewall. Guide wall 4 prevents the flow from separating from sidewall 16 of bypass part 6 having removal opening 33 with even greater reliability.

Furthermore, as shown in FIGS. 1 and 2, a turbulence-generating structure 23 is provided. This is formed by a plurality of slits 23 in diversion surface 20, which are situated respectively in a plane perpendicular to sidewalls 16, 17 of bypass part 6 and parallel to main flow direction 18. The slits have a rectangular cross section, and if dimensioning of b=6.5 mm is assumed the slit height may for example be about 1 mm and the slits may be positioned at a distance of 2 mm from one another. The slits may extend all the way through to front surface 13 of bypass part 6. However, in the preferred exemplary embodiment shown here, slits 23 have an inner surface 22 between diversion surface 20 and bypass part 6, which, starting from a second apex line 34, also curves elliptically toward the bypass part, and the respective ends of inner surface 22 that face away from second apex line 34 transition into a surface 24 that extends at an angle α relative to sidewalls 16, 17. This is shown most clearly in FIG. 4. Angle α is between 20° and 70° and is preferably 45°. To facilitate the manufacturing process, flow diversion element 2 may have a cavity 35 between inner surface 22 and front surface 13.

At diversion surface 20 the flow of medium that strikes it is partly diverted along to sidewalls 16, 17; however, it also penetrates slits 23 and there, at inner surface 22, is diverted in the direction of diagonally positioned surfaces 24. From there, the flow of medium exits slits 23 diagonally relative to main flow direction 18. At the end of ramp-like surfaces 24, powerful longitudinal vortices arise when the medium exits, which generate turbulence in the boundary layer flow at sidewalls 16, 17 so that the boundary layer does not undergo separation. As a result, pressure fluctuations which might otherwise affect the measuring channel via removal opening 33 are avoided. Turbulence also arises if the slits extend all the way through.

Figure 7:
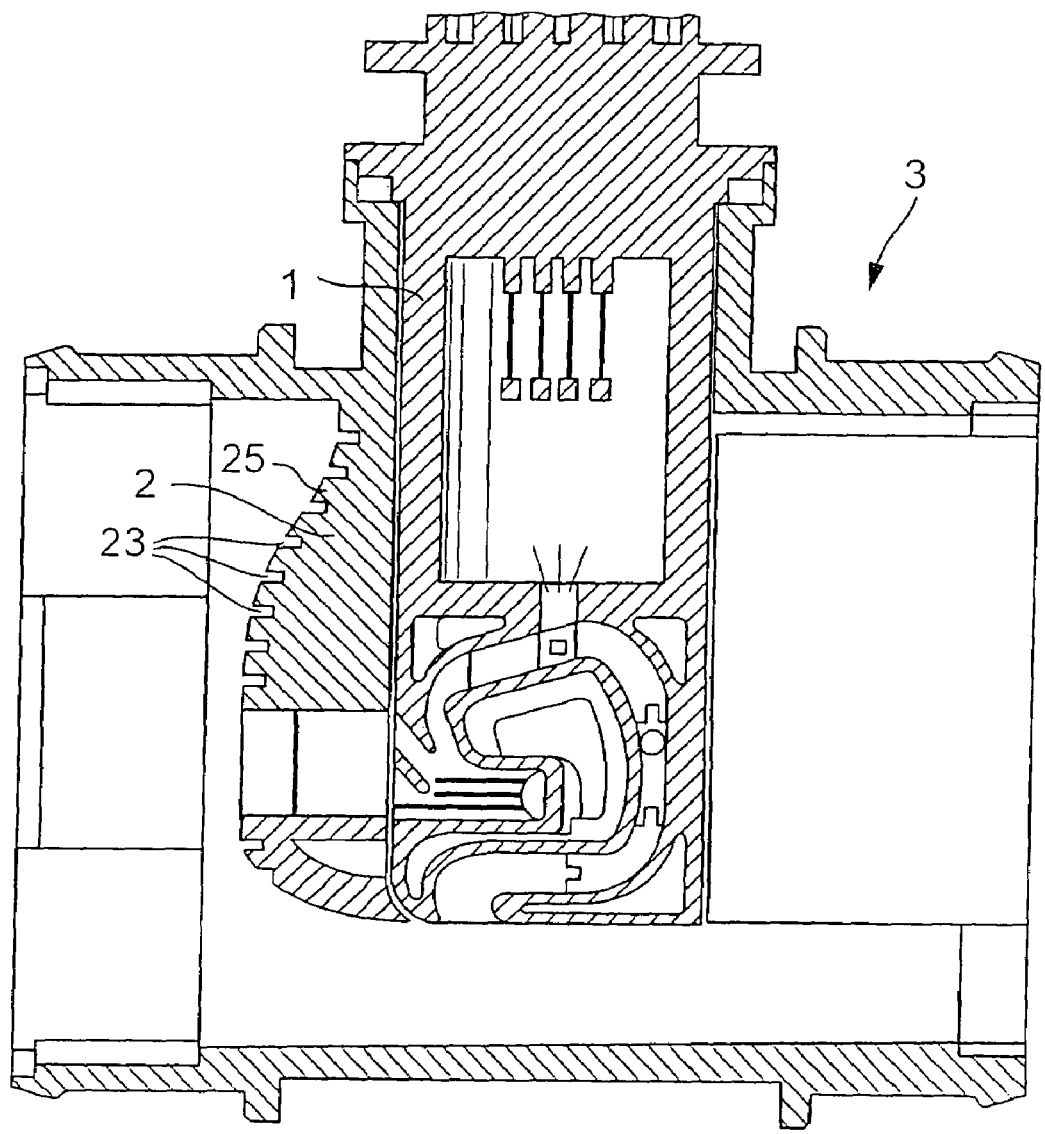
FIG. 7 shows a cross section through a third exemplary embodiment of the present invention.

FIG. 7 shows an exemplary embodiment in which apex line 25 is not straight and, by contrast with the exemplary embodiment shown in FIG. 1, does not extend perpendicular to main flow direction 18. Because the apex line extends diagonally relative to main flow direction 18, this forms a contour that curves forward in the area of through-opening 26 in the opposite direction to main flow direction 18. This is advantageous in that in FIG. 7 water which gathers in slits 23 and in the boundary case fills them is conveyed diagonally upward by the main flow and therefore is unable to enter inlet area 27 of bypass part 6.

Figure 5:
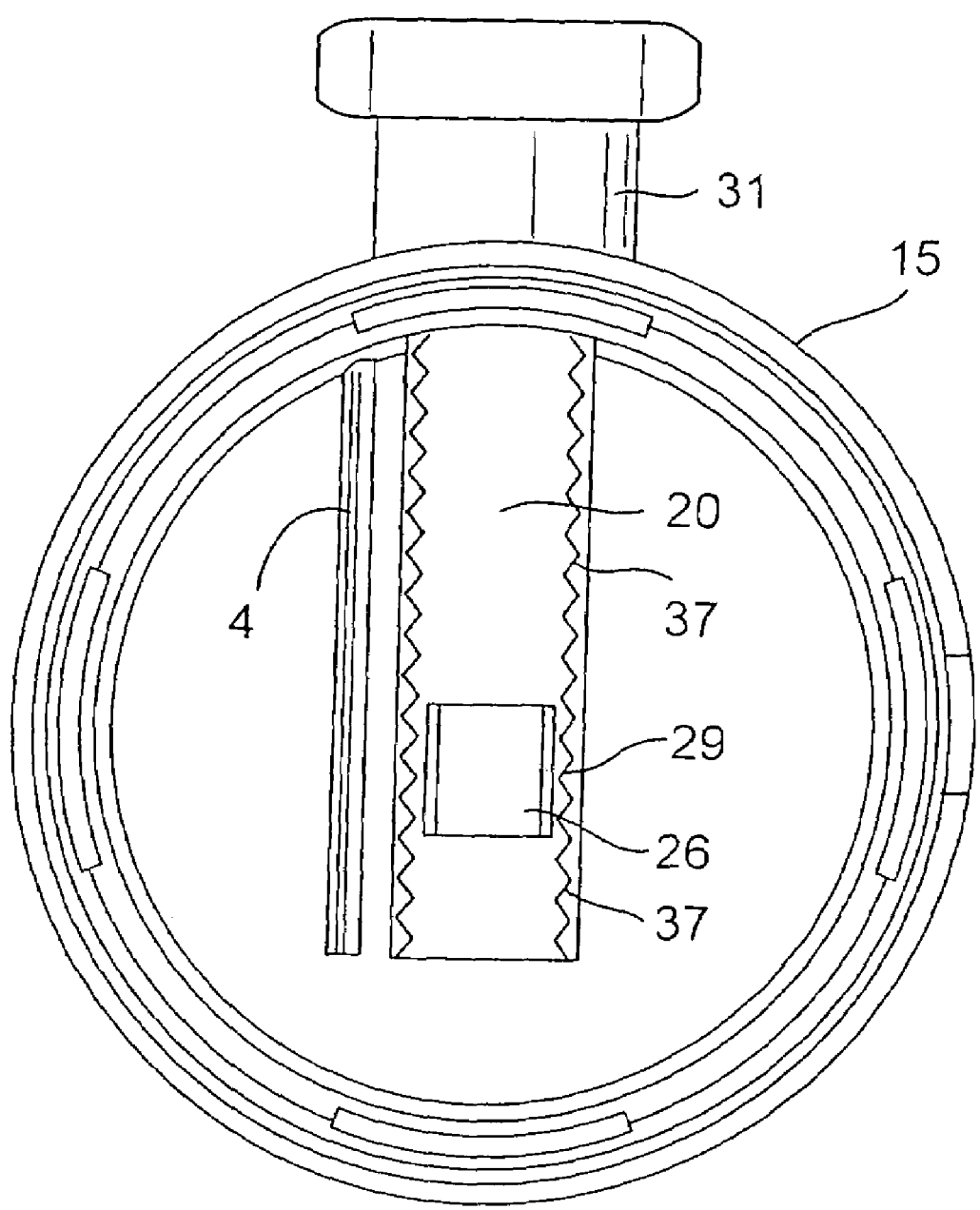
FIG. 5 shows a top view of a second exemplary embodiment of the device according to the present invention.
Figure 6:
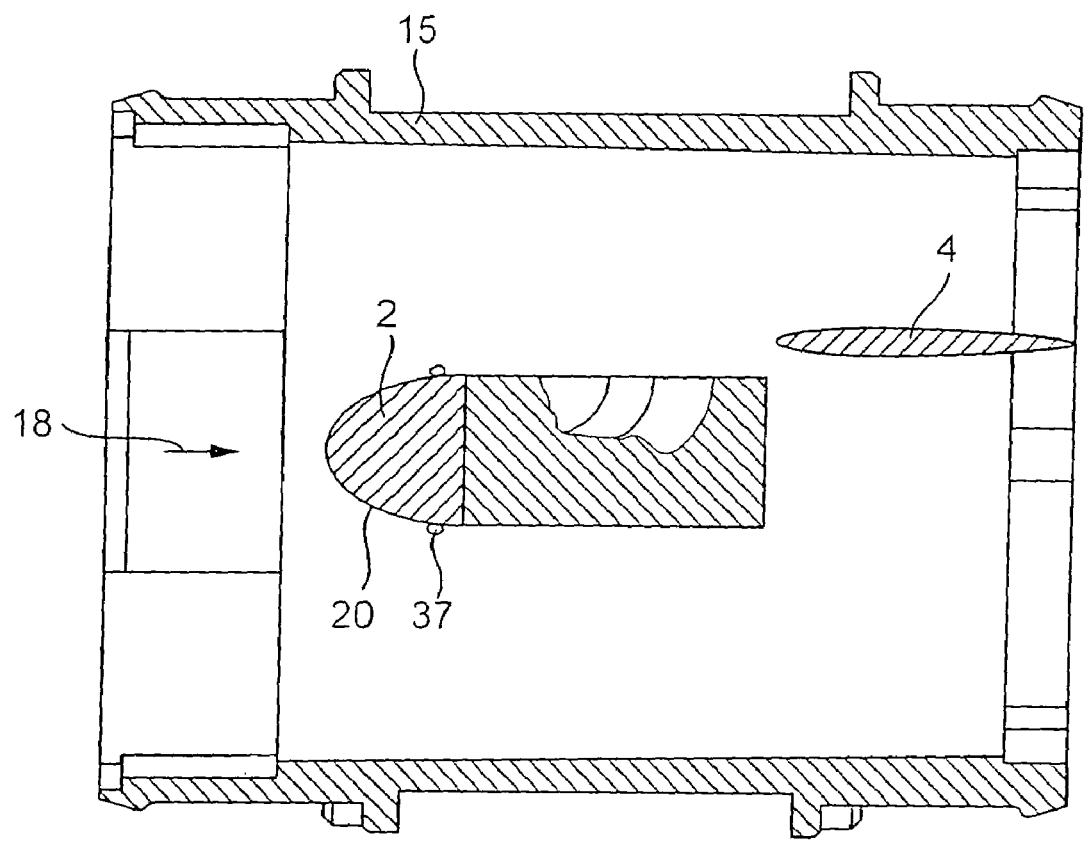
FIG. 6 shows a cross section through FIG. 5.

In FIG. 5 and FIG. 6, a further exemplary embodiment of the present invention is shown. Apart from the turbulence-generating structure, the design of the device is the same as in the exemplary embodiment shown in FIG. 1. A wire 37 is mounted, e.g., via adhesive bonding, on both sides of diversion surface 20 of flow diversion element 2. The diameter of the wire is about 1 mm. However, the wire may also be positioned in the immediate proximity of diversion surface 20 without touching the surface thereof. Wire 37 preferably has a plurality of alternating curves and a serrated shape having a large number of serrations; however, it may also be designed as straight. The boundary layer of flow diverted by elliptical diversion surface 20 becomes turbulent due to the wire, thus preventing separation of the flow at sidewalls 16, 17.

By contrast to the exemplary embodiments shown here, the turbulence-generating structure may also be created in the form of a small step or edge in diversion surface 20. Various different embodiments are feasible for this. It is important that the turbulence-generating structure is formed via a discontinuity and/or unevenness (e.g., a small step, edge or rib) on or at least in the immediate proximity of the evenly curved diversion surface of the flow diversion element, so that turbulence arises in the boundary layer of the flow.

Figure 8:
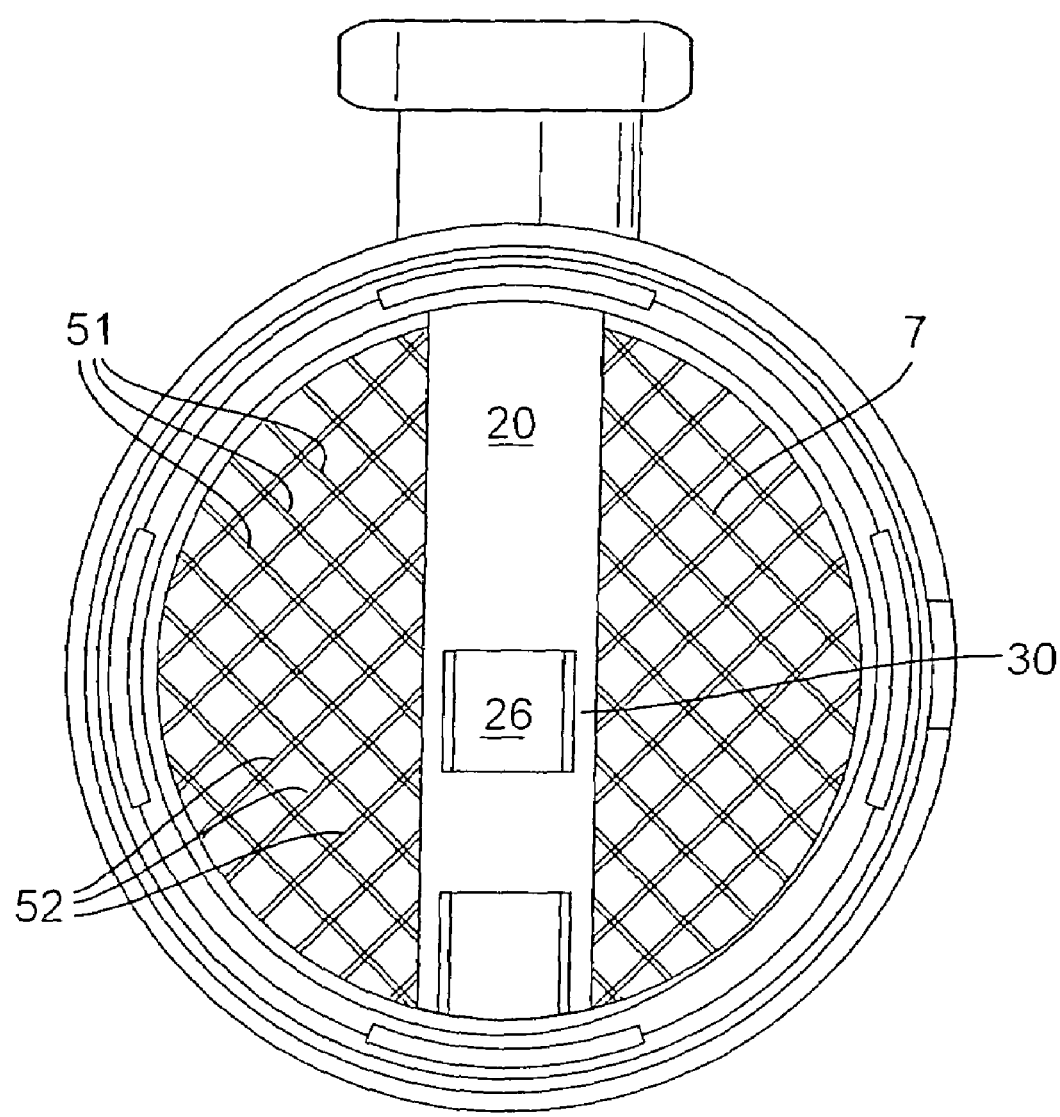
FIG. 8 shows a top view of a fourth exemplary embodiment of the present invention.
Figure 9:
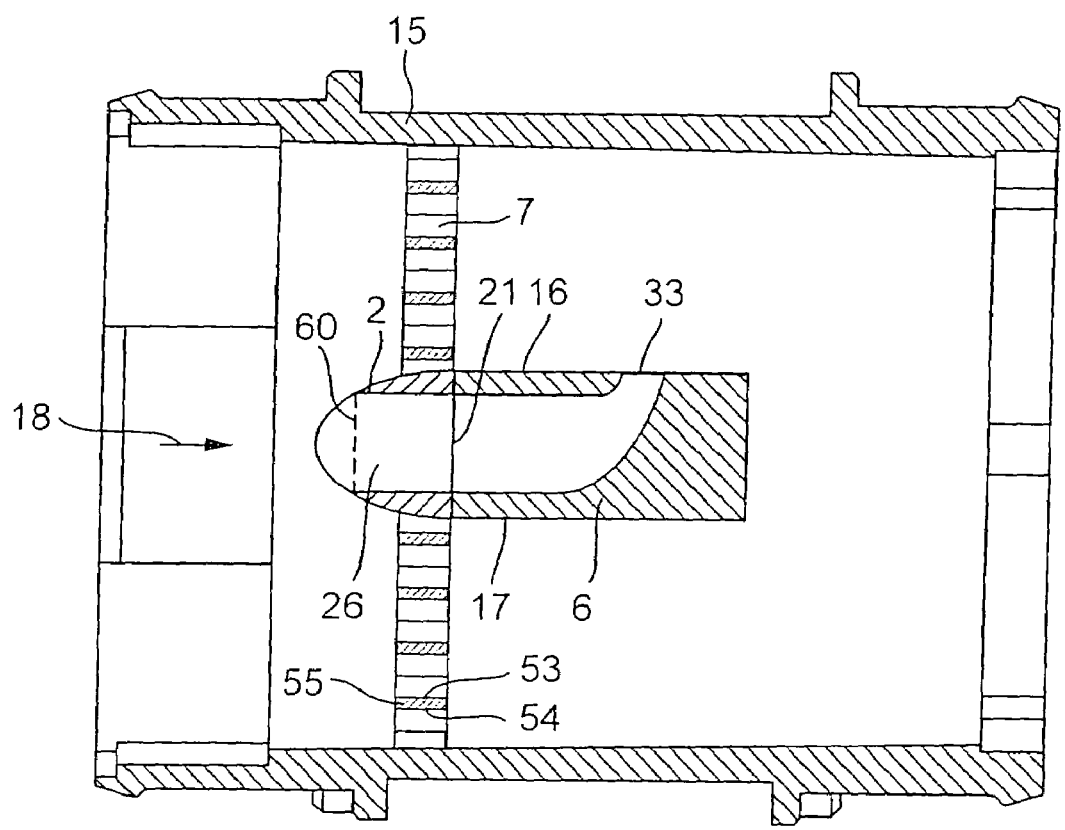
FIG. 9 shows a cross section through FIG. 8.

A further exemplary embodiment is shown in FIG. 8 and FIG. 9. In the case of this exemplary embodiment, a rectifier element 7 is provided in line component 3 level with flow diversion element 2 with respect to main flow direction 18. The rectifier element advantageously evens out the flow downstream from the rectifier element. Furthermore, the flow is also evened out upstream from the rectifier element, at least partly. As in the case of the exemplary embodiment shown in FIG. 1, flow diversion element 2 has through-opening 26, which is aligned with an opening 21 of the inlet area of the channel structure. Rectifier element 7 is situated downstream from orifice 60 of this through-opening 26 and upstream from bypass part 6 with respect to main flow direction 18, as is most clearly shown in FIG. 9. Orifice 60 of through-opening 26 is in a plane perpendicular to the main flow direction. Because rectifier element 7 is downstream from orifice 60, this advantageously ensures that the flow entering through-opening 26 does not pass through rectifier element 7, and flow disruptions that might arise downstream from the rectifier element also are unable to enter the through-opening. This exemplary embodiment is also particularly advantageous in that the rectifier does not have to be manufactured as a separate component and furthermore does not have to be installed separately. Instead, the rectifier element and flow diversion element 2 and line component 3 may be manufactured as a single piece, e.g., as injection-molded plastic, which is particularly cost-effective.

As shown in FIG. 8, rectifier element 7 may include for example a first lattice made of bars 51 parallel to one another and a second lattice made of bars 52 parallel to one another, first bars 51 being roughly perpendicular to second bars 52. Each bar has two guide surfaces 53, 54 extending parallel to main flow direction 18 and one front surface 55 facing the main flow, as shown in FIG. 9. However, it is also feasible to use a single lattice having parallel bars.

Figure 3:
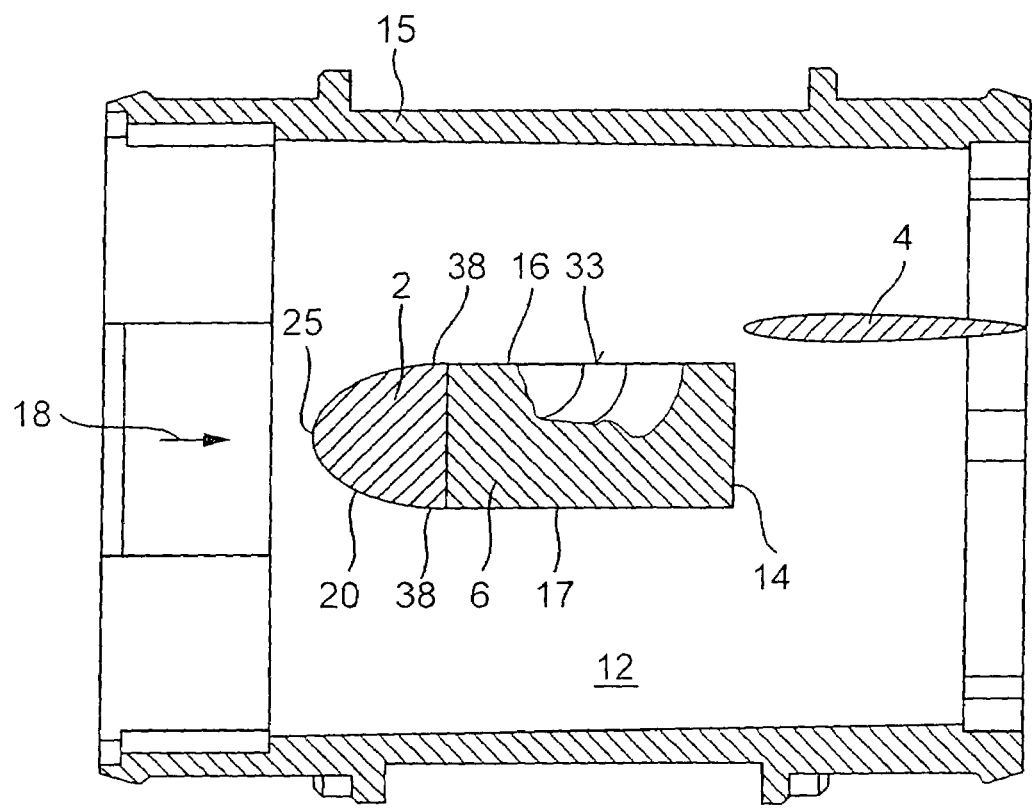
FIG. 3 shows a cross section through FIG. 2, along the line A-A.
Figure 4:
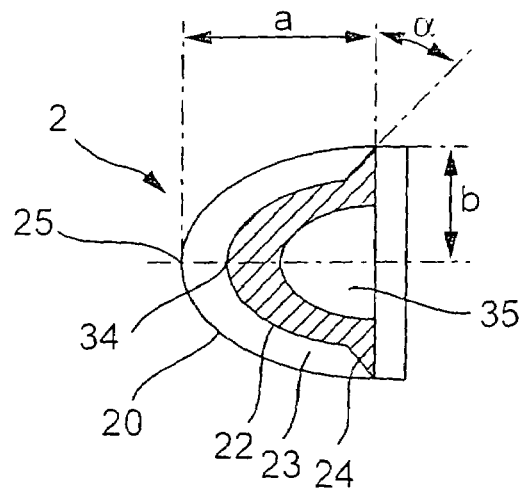
FIG. 4 shows a cross section through the flow diversion element in a plane parallel to the plane in FIG. 3.

Furthermore, it is also feasible to provide turbulence-generating structures on diversion surface 20 of flow diversion element 2 as shown in the exemplary embodiments shown in FIG. 2, FIG. 5 or FIG. 6, or to provide rectifier element 7 along with guide wall 4 shown in FIG. 3 in line component 3.

What is claimed is:

1. A device for determining at least one parameter of a medium flowing in a main flow direction (18) in a line for determining the air mass flow rate in the intake manifold of an internal combustion engine, comprising: a line component (3) that forms a line through-channel, and a sensor device (1) having a bypass part (6), which is situated in the line component (3) so that a partial stream of the medium flowing in the line component enters an inlet area (27) of a channel structure formed in the bypass part, the inlet area (27) having a removal opening (33) which opens into the line through-channel at at least one of two sidewalls (16, 17) of the bypass part (6) that extend parallel to the main flow direction (18), wherein a flow diversion element (2) is situated in the line component (3) upstream from the bypass part (6) with respect to the main flow direction (18) and has at least one diversion surface (20) facing the main flow direction (18), which, starting from an apex line (25) located at a distance from the bypass part (6), curves evenly on both sides toward the two sidewalls (16, 17) so that the ends (38) of the diversion surface (20) that face away from the apex line are aligned with the sidewalls (16, 17).

2. The device according to claim 1, wherein a turbulence-generating structure (23, 37) is provided on the diversion surface (20) of the bypass part (6) or at least in the immediate proximity thereof, at least upstream from the sidewall (16) having the removal opening (28) with respect to the main flow direction (18), and generates turbulence in the boundary layer of the flow at this sidewall (16) of the bypass part.

3. The device according to claim 2, wherein the turbulence-generating structure is formed via a discontinuity and/or an unevenness on the evenly curved diversion surface (20).

4. The device according to claim 2, wherein the turbulence-generating structure is formed via at least one wire (37) applied to the diversion surface (20) or situated in the immediate proximity thereof.

5. The device according to claim 4, wherein the wire (37) has a plurality of alternating curves and a serrated contour having a large number of serrations.

6. The device according to claim 2, wherein the turbulence-generating structure is formed via a plurality of slits (23) created in the diversion surface (20), each of which is in a plane perpendicular to the sidewalls (16, 17) of the bypass part (6) and parallel to the main flow direction (18).

7. The device according to claim 6, wherein the slits (23) have a rectangular cross section having an inner surface (22) between the diversion surface (20) and the bypass part (6), which preferably is also, starting from a second apex line (34), elliptically curved toward the bypass part, and each of the ends of the inner surface (22) facing away from the second apex line (34) transitions into a surface (24) extending diagonally relative to the sidewalls (16, 17). (FIG. 4).

8. The device as recited in claims 2, wherein the turbulence-generating structure (23) is situated perpendicular to the main flow direction (18) and parallel to the sidewalls (16, 17) above as well as below the through-opening (26) and in particular additionally on the sidewalls (30) that delimit the through-opening.

9. The device according to claim 1, wherein the diversion surface (20) is elliptically curved.

10. The device according to claim 9, wherein the small semi-axis (b) of the elliptically curved diversion surface (20) is equal to half the distance between the two sidewalls (16, 17) of the bypass part, and the large semi-axis (a) of the elliptically curved diversion surface (20) is at least twice the length of the small semi-axis (b).

11. The device according to claim 1, wherein the flow diversion element (2) has a through-opening (26) which is aligned with an opening (21) of the inlet area (27) of the channel structure.

12. The device as recited in claims 11, wherein the turbulence-generating structure (23) is situated perpendicular to the main flow direction (18) and parallel to the sidewalls (16, 17) above as well as below the through-opening (26) and in particular additionally on the sidewalls (30) that delimit the through-opening.

13. The device according to claim 1, wherein the flow diversion element (2) is manufactured separately from the sensor device as a separate component, and in particular is designed so that it and the line component (3) form a single component.

14. The device according to claim 1, wherein a rectifier element (7) is situated in the line component (3) level with the flow diversion element (2) and upstream from the bypass part (6) with respect to the main flow direction (18).

15. The device according to claim 14, wherein the flow diversion element (2) has a through-opening (26) which is aligned with an opening (21) of the inlet area (27) of the channel structure, and the rectifier element (7) is situated downstream from the orifice (60) of the through-opening (26) with respect to the main flow direction (18).

16. The device according to claim 14, wherein the rectifier element (7), the flow diversion element (2) and the line component (3) are connected to each other to form a single component.

17. The device according to claim 14, wherein the integrated component that includes the rectifier element (7), the flow diversion element (2) and the line component (3) is manufactured from plastic, in particular as an injection-molded part.

18. The device according to claim 14, wherein the rectifier element (7) includes a first lattice made of bars (51) parallel to one another and a second lattice made of bars (52) parallel to one another, the first bars (51) being roughly perpendicular to the second bars (52).

* * * * *